United States Patent
Ogata et al.

(10) Patent No.: US 6,230,901 B1
(45) Date of Patent: *May 15, 2001

(54) MICROFINE FIBER PRODUCT AND PROCESS FOR PRODUCING THE SAME

(75) Inventors: Satoshi Ogata, Moriyama; Kazuyuki Nagae, Shiga-ken; Kazue Yamamoto, Yokaichi, all of (JP)

(73) Assignee: Chisso Corporation, Osaka-Fu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/624,197

(22) Filed: Apr. 3, 1996

Related U.S. Application Data

(63) Continuation of application No. 08/275,770, filed on Jul. 15, 1994.

(30) Foreign Application Priority Data

Jul. 16, 1993 (JP) .................................................. 5-199070

(51) Int. Cl.$^7$ .............................. B01D 39/16; D04H 1/56
(52) U.S. Cl. .................... 210/496; 210/497.01; 210/505; 428/903; 156/167; 264/6; 264/115; 264/122; 264/211.12
(58) Field of Search .................... 264/DIG. 48, DIG. 75, 264/6, 8, 115, 122, 171, 176.1, 211.12; 55/297; 156/167; 210/505, 508, 497.01, 496; 428/288, 296, 903

(56) References Cited

U.S. PATENT DOCUMENTS

| | | | |
|---|---|---|---|
| 3,904,798 | * 9/1975 | Vogt et al. ........................ | 210/502.1 |
| 3,981,650 | * 9/1976 | Page .................................. | 425/131.5 |
| 4,100,009 | * 7/1978 | Nakajima et al. ................. | 210/508 |
| 4,261,373 | * 4/1981 | Tamaoki et al. .................. | 156/180 |
| 4,376,675 | * 3/1983 | Perrotta ............................. | 210/509 |
| 4,594,202 | * 6/1986 | Pall et al. .......................... | 264/8 |
| 4,714,647 | * 12/1987 | Shipp, Jr. et al. ................ | 156/167 |
| 4,758,466 | * 7/1988 | Dabi et al. ........................ | 428/283 |
| 4,814,032 | * 3/1989 | Taniguchi et al. ................ | 156/167 |
| 5,122,270 | * 6/1992 | Ruger et al. ...................... | 210/497.1 |
| 5,225,014 | * 7/1993 | Ogata et al. ...................... | 156/167 |

OTHER PUBLICATIONS

Webster's Seventh New Collegiate Dictionary, ©1966 G. & C. Merriam Company, Springfield, Massachusetts, p. 860.*
GB 0,621,950, Apr. 1949.*

* cited by examiner

Primary Examiner—Mary Lynn Theisen
(74) Attorney, Agent, or Firm—Fay, Sharpe, Fagan, Minnich & McKee, LLP

(57) ABSTRACT

A cylindrical filter which is easily produced and has a high withstand strength, a high filtration accuracy and a long filtration life; a microfine fiber web and a non-woven fabric suitable to a production of such a cylindrical filter; and processes for producing such web, non-woven fabric and cylindrical filter, are provided, the web consisting of microfine mixed fibers spun according to melt-blown process, the mixed fibers consisting of high melting point microfine fibers and low melting point microfine fibers having a melting temperature difference of 10° c. or more, the low melting point microfine fibers being contained in a quantity of 10 to 90% by weight in the mixed fibers; the non-woven fabric being obtained by heat-treating the web; and the cylindrical filter being obtained by winding up the web or the nonwoven fabric, followed by heat-treatment.

8 Claims, No Drawings

MICROFINE FIBER PRODUCT AND PROCESS FOR PRODUCING THE SAME

This is a continuation of co-pending application Ser. No. 08/275,770 filed on Jul. 15, 1994.

BACKGROUND OF THE INVENTION

1. Field of the Invention

This invention relates to microfine mixed fibers spun according to melt-blown process, a fiber product consisting of the microfine mixed fibers and a process for producing the fibers and the fiber product. More particularly, it relates to fiber products consisting of microfine mixed fibers consisting of high melting point microfine fibers and low melting point microfine fibers, the melting point difference between both the fibers being 10° C. or more, and the content of the low melting point microfine fibers in the mixed fibers being 10 to 90% by weight, and a process for producing the fiber products.

Concretely, it relates to a cylindrical filter having a good pressure resistance strength and filtration accuracy and a long filtration life.

2. Description of the Related Art

Microfine fibers have been processed into non-woven fabrics or molded products and have been broadly used as the surface material for disposable diaper, dust-proof clothes, mask, wiping cloth, filter for microfiltration, etc. As the filter for microfiltration, an air filter, a filter for washing liquid during the steps of producing electronic equipments, a prefilter for water for pharmaceutical preparations, a filter for removing microorganisms from foods or potable water, etc. are known.

Japanese patent application laid-open No. Sho 54-134177 discloses a process for producing a non-woven fabric of microfine fibers wherein a thermoplastic resin is degraded to have a low viscosity in a spinning device, followed by spinning according to melt-blown process. Further, Japanese patent application laid-open No. Sho 60-99057 discloses a process for producing a non-woven fabric of microfine conjugate fibers wherein two kinds of thermoplastic resins are conjugated into side by side type, followed by spinning according to melt-blown process.

As the filter, Japanese patent application laid-open No. Sho 60-216818 discloses a filter for microfiltration obtained by stacking microfine fibers on a shaft and supporting the structure only by way of mechanical entanglement of the fibers to one another, and having a constant void ratio. Japanese patent application laid-open No. Hei 1-297113 discloses a cylindrical filter obtained by winding up non-woven fabrics, wherein the closer to the outer surface of the filter, the larger the fiber diameter and the pore diameter. Japanese patent application laid-open No. Hei 4-126508 discloses a cartridge filter consisting of microfine conjugate fibers, prepared according to melt-blown process. Japanese patent application laid-open No. Hei 5-96110 discloses a cartridge filter consisting of microfine fibers obtained according to melt-blown process, wherein the fiber diameter is successively varied.

In the case of conventional non-woven fabrics consisting of microfine fibers of a single component, as the structure have been supported mainly by entanglement of fibers with one another, drawbacks have been raised that the non-woven fabrics have a low strength and many fluffs, and are unsuitable to apply for the surface material for disposable diaper. When the fabrics are heat-treated by means of heating rolls or the like, in order to enhance the strength of the fabrics, then the fibers are liable to melt and the resulting non-woven fabrics become film-like and has an inferior feeling.

Further, in the case of conventional filters using microfine fibers of a single component, adhesion between fibers is few. Thus, drawbacks have been raised that the filtration accuracy varies due to heat-sterilizing treatment, high temperature filtration, vibration or the like, the hardness is low and the withstanding pressure is insufficient.

Further, the conjugate melt-blown process has drawbacks that the spinneret is complicated and expensive, and it is difficult to control the melt viscosity for uniformly feeding different kinds of polymers into the respective extrusion holes.

SUMMARY OF THE INVENTION

The present inventors have made extensive research in order to solve the above problems, and as a result have found that when a high melting point resin and a low melting point resin, having a melting point difference of 10° C. or more, are extruded from the respective extruders therefor, while controlling the quantity of the low melting point resin extruded so as to give 10 to 90% by weight based upon the total weight of the resins extruded, and so as to give high melting point microfine fibers and low melting point microfine fibers, followed by spinning according to melt-blown process, and subjecting the resulting microfine mixed fibers consisting of high melting point microfine fibers and low melting point microfine fibers, to suitable molding processing and heat-treatment, to obtain the resulting web, which is then processed into a non-woven fabric or a cylindrical filter, each having superior properties; and have completed the present invention.

The present invention has the following aspects.

(1) A web composed of microfine mixed fibers spun according to melt-blown process and consisting of high melting point microfine fibers and low melting point microfine fibers having a melting point difference of 10° C. or more, the low melting point microfine fibers being contained in a proportion of 10 to 90% by weight in the microfine mixed fibers.

(2) A non-woven fabric composed of microfine mixed fibers, spun according to melt-blown process and consisting of high melting point microfine fibers and low melting point microfine fibers having a melting point difference of 10° C. or more, the high melting point microfine fibers having been fixed by melt adhesion of the low melting point microfine fibers contained in the microfine fiber mixture in a proportion of 10 to 90% by weight.

(3) A molded product having a three dimensional structure composed of microfine mixed fibers, spun according to melt-blown process and consisting of high melting point microfine fibers and low melting point microfine fibers having a melting point difference of 10° C. or more, the high melting point microfine fibers having been fixed by melt adhesion of the low melting point microfine fibers contained in the microfine fiber mixture in a proportion of 10 to 90% by weight.

(4) A cylindrical filter composed of microfine mixed fibers, spun according to melt-blown process and consisting of high melting point microfine fibers and low melting point microfine fibers having a melting point difference of 10° C. or more, the high melting point microfine fibers having been fixed by melt adhesion of the low melting point microfine fibers contained in the microfine fiber mixture in a proportion of 10 to 90% by weight.

(5) A fiber product according to any one of items (1) to (4), wherein either one of the high melting point microfine fibers or the low melting point microfine fibers are conjugate fibers.

(6) A fiber product according to any one of items (1) to (5), wherein the fiber diameter of the high melting point microfine fibers and/or the low melting point microfine fibers is 20 $\mu$m or less.

(7) A fiber product according to any one of items (1) to (5), wherein the fiber diameter of the high melting point microfine fibers and/or the low melting point microfine fibers is 0.1 to 10 $\mu$m.

(8) A cylindrical filter according to item (4), wherein the fiber diameter of the high melting point microfine fibers and/or the low melting point microfine fibers is successively reduced along the filtration direction of the filter and the ratio of the maximum fiber diameter to the minimum one is twice or more.

(9) A cylindrical filter according to item (4), wherein the pore diameter of a filtration layer of the filter is successively reduced along the filtration direction of the filter and the ratio of the maximum pore diameter to the minimum one is twice or more.

(10) A cylindrical filter according to item (4), wherein the pore diameter of a filtration layer of the filter is varied in the order of large, small and large along the filtration direction, and the ratio of the maximum pore diameter to the minimum one is twice or more.

(11) A process for producing a microfine mixed fiber web consisting of high melting point microfine fibers and low melting point microfine fibers, which process comprises spinning a high melting point resin and a low melting point resin according to melt-blown process, using the respective extruders therefor, while controlling the quantity of the low melting point resin extruded, so as to give 10 to 90% by weight based upon the total extruded quantity of resins.

(12) A process for producing a non-woven fabric consisting of high melting point microfine fibers and low melting point microfine fibers and having the high melting point microfine fibers fixed by melt-adhesion of the low melting point microfine fibers thereonto, which process comprises a step of spinning a high melting point resin and a low melting point resin, having a melting point difference of 10° C. or more, according to melt-blown spinning process, using the respective extruders therefor, while controlling the quantity of the low melting point resin extruded so as to give 10 to 90% by weight based upon the total extruded quantity of resins, to obtain a microfine mixed fiber web, and a step of heat-treating the microfine mixed fiber web within a temperature between the softening temperature of the low melting point microfine fibers and that of the high melting point microfine fibers.

(13) A process for producing a molded product consisting of high melting point microfine fibers and low melting point microfine fibers and having the high melting point microfine fibers fixed by melt-adhesion of the low melting point microfine fibers thereonto, which process comprises a step of spinning a high melting point resin and a low melting point resin, having a melting point difference of 10° C. or more, according to melt-blown spinning process, using the respective extruders therefor, while controlling the quantity of the low melting point resin extruded so as to give 10 to 90% by weight based upon the total extruded quantity of resins, to obtain a microfine mixed fiber web, and a step of molding the microfine mixed fiber web within a temperature between the softening temperature of the low melting point microfine fibers and that of the high melting point microfine fibers.

(14) A process for producing a cylindrical filter consisting of high melting point microfine fibers and low melting point microfine fibers and having the high melting point microfine fibers fixed by melt-adhesion of the low melting point microfine fibers thereonto, which process comprises a step of spinning a high melting point resin and a low melting point resin, having a melting point difference of 10° C. or more, according to melt-blown spinning process, using the respective extruders therefor, while controlling the quantity of the low melting point resin extruded so as to give 10 to 90% by weight based upon the total extruded quantity of resins, to obtain a microfine mixed fiber web, a step of heat-treating the microfine mixed fiber web within a temperature between the softening temperature of the low melting point microfine fibers and that of the high melting point microfine fibers, and a step of winding up the microfine mixed fiber web into a cylindrical form.

(15) A process for producing a cylindrical filter according to item (14), wherein, by successively varying the quantity of extrudimg resin and the spinning speed at the time of obtaining the microfine mixed fiber web according to melt-blown spinning process, a microfine mixed fiber web has the fiber diameter varied continuously or stepwise.

(16) A process for producing a cylindrical filter according to item (14), wherein the pressure applied to the web during winding up thereof is successively varied.

DETAILED DESCRIPTION OF PREFERRED EMBODIMENTS

The melt-blown process refers to a process of blowing a molten thermoplastic resin extruded from spinning nozzles, onto a collecting conveyer net or a rotating hollow shaft by means of a high temperature and high speed gas blown out from around the spinning nozzles to obtain a fiber web, and this process is disclosed in Van A. Wente, Industrial and Engineering Chemistry, vol. 48, No. 8 (1956), p. 1342 to 1346, "Super Fine Thermoplastics", or U.S. Pat. No. 3,532, 800.

As the high temperature and high speed gas, air, an inert gas or the like of 0.5 to 10 kg/cm$^2$·G, 200° to 500° C. and 1 to 100 m$^3$/min is usually used, and the distance between the spinning nozzles and the collecting conveyer net or the hollow shaft is usually about 30 to 80 cm, preferably 15 to 60 cm, more preferably 20 to 50 cm.

The microfine mixed fiber web of the present invention is produced according to melt-blown process using a spinneret wherein the low melting point resin and the high melting point resin are extruded from separate spinning nozzles, and the low melting point resin and the high melting point resin are fed into the spinneret by means of the respective extruders. According to this process, a web wherein two kinds of microfine fibers each having a fiber diameter of 20 $\mu$m or less are mixed, is easily obtained.

For producing the microfine mixed fiber web, various types of spinnerets for melt-blown can be employed. For example, a spinneret described in U.S. Pat. No. 3,981,650 wherein spinning nozzles for the high melting point resin and spinning nozzles for the low melting point resin are arranged alternately in a row in one spinneret can be employed. Further, a process may be also employed wherein a spinneret for the high melting point resin and that for the low melting point resin are simultaneously employed and the low melting point microfine fiber web and the high melting point microfine fiber web, each obtained by the respective spinnerets, are laminated. Further, it is also possible to treat the resulting laminate by means of needle punching or the like to improve the mixed state of the fibers. Further, in order to obtain a microfine mixed fiber web in a more homogeneously mixed state, it is preferred to employ a spinneret disclosed in U.S. Pat. No. 3,981,650.

When a plurality of spinnerets are used, if a spinneret for microfine conjugate fibers, disclosed in Japanese patent application laid-open No. Sho 60-99057 is employed for either one of the above plural spinnerets, it is possible to control the quantity of the low melting point microfine fibers in the microfine mixed fibers.

When the numbers of spinning nozzles allotted to the low melting point resin and the high melting point resin are varied or the quantities of the respective resins extruded are varied, it is possible to vary the content of the low melting point resin fibers in the microfine mixed fibers.

Further, when spinning is carried out in different extruded quantities per spinning nozzles for the respective resins, a mixture of microfine fibers having different finenesses is obtained.

Further, when the spinning conditions such as the quantities of the resins extruded, ejecting speed of high temperature and high speed gas, etc. are varied with lapse of time, it is possible to obtain a microfine mixed fiber web having its fiber diameters varied with lapse of time, continuously or stepwise. When the microfine mixed fiber web having the fiber diameter varied as described above is heat-treated as described below, it is possible to obtain a cylindrical filter having the fiber diameter varied successively along the direction of filtration.

As the low melting point resin and the high melting point resin used in the production of the microfine mixed fiber web of the present invention, two kinds of thermoplastic resins having a melting temperature difference of 10° C. or more, preferably 15° C. or more, more preferably 30° C. or more are used. If the melting temperature difference is less than 10° C., when the microfine mixed fiber web is processed into a non-woven fabric, a filter or the like by heat treatment, not only the low melting point microfine fibers, but also the high melting point microfine fibers, are softened or melted, whereby the fiber shape is liable to be lost and the whole of the microfine mixed fiber web is often converted into film. When the web is converted into film, the resulting non-woven fabric is inferior in the flexibility, elasticity, air-permeability, water-permeability, etc. and also in the feeling, while the resulting filter has a low filtrability.

In addition, the melting point referred to herein generally means the temperature of the endothermic peak measured by means of differential scanning calorimeter (DSC). In the case of amorphous thermoplastic resins such as low melting point copolymerized polyester, etc., the melting point not always appears clearly; hence it can be substituted by softening point.

Examples of the thermoplastic resins used for the microfine mixed fiber web of the present invention are polyamides, polyesters, low melting point copolymerized polyesters, polystyrene, polyurethane elastomers, polyester elastomers, polypropylene, polyethylene, copolymerized polypropylenes (such as bipolymer or terpolymer of propylene as main component with ethylene, butene-1, 4-methylpentene-1, etc.). Examples of combinations of thermoplastic resins are polyethylene/polypropylene, copolymerized polypropylene/polypropylene, low melting point copolymerized polyester/polyester and polyethylene/polyester, but the combination are not limited thereto. Among them, combinations of copolymerized polypropylene/polypropylene and low melting point copolymerized polyester/polyester are preferable, since fiber molded products having a high bonding force of fibers to one another by means of heat treatment and a high strength are obtained.

These thermoplastic resins are preferred to be virgin resins, but it does not matter even if they are reclaimed resins. Even in the case of raw materials generating fiber breakage to some extent according to conventional spinning processes, spinnability is hardly affected in the case of melt-blown process; hence only if the kind and melting point of the resins are distinct, even the reclaimed resins can be used and the use is economical.

As to the microfine mixed fiber web of the present invention, the mixed fibers contain the low melting point microfine fibers in a content of 10 to 90% by weight, preferably 20 to 70% by weight, more preferably 30 to 50% by weight. If the content of the low melting point microfine fibers in the microfine mixed fiber web is lower than 10% by weight, non-woven fabric or cylindrical filter obtained by heat-treating the web is few in the heat-bonded points of fibers, has many fluffs and a low strength. On the other hand, if the content of the low melting point microfine fibers exceeds 90% by weight, low melting point microfine fibers having lost the fiber shape by heat treatment fill the voids between fibers; hence this results in conversion of non-woven fabric into film and reduction of feeling or reduction of filtrability of filter.

The fiber diameter of the microfine mixed fiber web of the present invention has no particular limitation, but employing melt-blown process, microfine fibers having a fiber diameter of 20 $\mu$m or less are usable, and a product of 15 to 0.1 $\mu$m and further 10 to 0.5 $\mu$m is obtained by selecting spinning conditions. When a microfine mixed fiber web having a fiber diameter of 20 $\mu$m or less is heat-treated as described below, it can form a filter suitable to microfiltration.

The fiber diameter of the high melting point microfine fibers and that of the low melting point microfine fibers are not always required to be the same. Further, for the microfine mixed fiber web used for the cylindrical filter of the present invention, the above microfine mixed fibers are mainly used, but fibers having a fiber diameter of 20 $\mu$m or larger may be mixed therewith, within a range not damaging the filtration accuracy.

The non-woven fabric of the present invention is obtained by heat-treating the above mentioned microfine mixed fiber web. The heat treatment is carried out within a temperature range between the softening point of the low melting point microfine fibers in the microfine mixed fiber web and that of the high melting point microfine fibers therein. As the heat-treatment process, known processes are usable such as thermocompression bonding process by means of heated emboss rolls, air-through process by means of heated air, process by means of infrared lamp, etc. By heat treatment, the high melting point microfine fibers are fixed by melt adhesion of the low melting point microfine fibers, while retaining the fiber shape thereof, as it is, to form a three-dimensional, reticulated structure. The thus obtained non-woven fabric has minute voids between fibers constituted by microfine fibers having a fiber diameter of 20 $\mu$m or less, and is provided with superior properties such as soft feeling, no fluffs and a high strength.

Based upon such superior properties, the non-woven fabric of the present invention is usable as a surface material for disposable diaper, dust-proof clothes, mask, wiping cloth, air filter, etc.

The molded product having a three dimensional structure of the present invention wherein mixed microfine fibers spun according to melt-blown process consisting of high melting point microfine fibers and low melting point microfine fibers having a melting point difference of 10° C. or more, contain the low melting point microfine fibers in a quantity of 10 to 90% by weight and the high melting point microfine fibers having been fixed by melt-adhesion of the low melting point microfine fibers, is obtained by heat-molding a non-woven fabric obtained by heat-treating a web of the above microfine mixed fibers.

The thus obtained sterically molded product is provided with superior properties of having minute voids between fibers constituted by microfine fibers and a soft feeling, no fluff and a high strength and a characteristic that the steric shape hardly collapses due to the three-dimensional reticulated structure fixed by melt-adhesion of the low melting point microfine fibers onto the high melting point microfine fibers; thus the steric molded product has use applications such as medical mask, dust-proof mask, shoulder pad, etc.

The non-woven fabric and the sterically molded product of the present invention can be made into electret filter. As the process for making the electret, a process of treating the microfine mixed fiber web, the non-woven fabric or a molded product obtained by heat-treatment, by means of colona discharge of a direct current voltage of about 1 to 30 killovolts or the like is employed, and a product having a surface charge density of about 10 to 45 coulombs/cm$^2$ is preferred.

The cylindrical filter of the present invention wherein microfine mixed fibers spun according to melt-blown process and consisting of high melting microfine fibers and low melting point microfine fibers having a melting temperature difference of 10° C. or more, containing 10 to 90% by weight of the low melting point microfine fibers therein and the high melting point microfine fibers have been fixed by melt-adhesion of the low melting point microfine fibers, can be obtained according to a process of stacking the above microfine mixed fibers spun according to melt-blown process on a rotating air-permeable shaft, as disclosed in U.S. Pat. No. 4,594,202, or according to a process of winding up the above microfine mixed fibers on a rotating shaft while being carried by net conveyer, as disclosed in U.S. Pat. No. 4,100,009.

The usable basis weight of the microfine mixed fiber web or non-woven fabric is 3 to 1,000 g/m$^2$, preferably 4 to 700 g/m$^2$, and since the fixing of the high melting microfine fibers by melt adhesion of the low melting point microfine fibers can be realized certainly and homogeneously, the basis weight is most preferably 100 g/m$^2$ or less.

In any of the processes, heat-treatment is carried out at a temperature in the range between the softening point of the low melting point microfine fibers in the microfine mixed fibers and that of the high melting point microfine fibers therein, at the time of winding-up. The heat-treatment includes a process of heating the web or the non-woven fabric, and a process of heating the microfine mixed fibers wound up on a shaft. As the heating process, known processes are usable, such as thermal pressure bonding process by means of heated emboss rolls, air-through process by means of heated air, a process by means of infrared lamp, etc. Among these, the process of heating the web or the non-woven fabric according to the air-through process by means of heated air, makes it possible to wind up a web having no thickness unevenness since the fiber order of the web is not disturbed, and also it is possible to uniformly heat the whole of the heated surface; hence a cylindrical filter having stabilized the quality such as filtration accuracy, etc.

In the case where the microfine mixed fibers are stacked onto a rotating, air-permeable shaft and wound up, without cooling the fibers, even if a positive heat-treatment is not carried out, it is possible to heat-bond the high melting point microfine fibers by the heat of the fibers themselves retained.

Since the thus obtained cylindrical filters are constituted by the microfine mixed fibers, it has a high filtration accuracy, and since the high melting point microfine fibers have been fixed by melt-adhesion of the low melting point microfine fibers to form a three-dimensional, reticulated structure, a cylindrical filter is obtained whose filtration accuracy is not varied even by heat-sterilization treatment, high temperature filtration, vibration, etc. and which has a high withstand strength.

When the microfine mixed fiber web or the non-woven fabric is processed into a cylindrical filter, if the fiber diameter of the used microfine mixed fibers is successively varied, a further superior cylindrical filter is obtained. For example, when the fiber diameter of the microfine mixed fiber web at the time of start of its winding-up is small and as the winding-up advances, the fiber diameter is successively made larger, the size of the voids between the fibers inside the filter (hereinafter referred to as the pore diameter of the filtration layer) becomes successively smaller along the filtration direction of the filter. Such a filter can collect particles having different particle sized, while classifying the particles so that rough particles can be caught on the surface of the filter and fine particles can be caught inside the filter; hence a filter having a long filtration life is constituted.

Further, when the fiber diameter of the microfine mixed fiber web is made larger at the time of start of winding-up of the web; as the winding-up advances, the diameter is once made smaller; and the diameter is again made larger, then a filter having a characteristic of a high withstanding pressure besides the above characteristic of the long filtration life is obtained.

In any of the cases, the larger the change of the fiber diameter, the greater the effect, and when the ratio of the maximum fiber diameter to the minimum fiber diameter is twice or more, the effect is notable, and the ratio is preferably 3 to 20 times, more preferably 4 to 15 times.

In the production of the microfine fibers according to melt-blown process, as the means for varying the fiber diameter, when the quantity of thermoplastic resin extruded is increased, or the flow velocity of blowing air current is reduced, it is possible to make the fiber diameter larger, and to the contrary, when the quantity of thermo-plastic resin extruded is reduced, or the flow velocity of the blowing current is increased, it is possible to make the fiber diameter less, and further, these means may be combined.

As another process for obtaining a filter wherein the pore diameter of the filtration layer is successively varied along the filtration direction of the filter, there is a process wherein the pressure applied onto the microfine mixed fiber web or the non-woven fabric being wound up on a rotating shaft is successively varied. For example, when the pressure at the time of start of winding-up of the microfine mixed fiber web is made larger, and as the winding-up advances, the pressure is successively reduced, the pore diameter of the filtration layer is successively reduced along the filtration direction of the filter (from the outside of the filter toward the inside thereof). The thus obtained filter has a characteristic of a long filtration life, like the above filter obtained by varying the fiber diameter from the smaller one down to the larger one.

Further, when the pressure applied at the time of winding-up is successively varied in the order of lower→higher→lower, there is obtained a filter wherein the pore diameter of the filtration layer is successively varied to larger→smaller→larger along the filtration direction of the filter (from the outside of the filter toward the inside thereof). The thus obtained filter has a characteristic of a long filtration life and a high pressure-resistance strength as in the above filter obtained by varying the fiber diameter to larger→smaller→larger.

In any of the cases, the larger the change of the pore diameter, the greater the effect, and when the ratio of the maximum pore diameter to the minimum pore diameter is twice or more, the effect is notable, and the ratio is preferably 3 to 20 times, more preferably 4 to 15 times.

The change of the fiber diameter or the pore diameter may be continuous or stepwise. As to the filtration direction of the cylindrical filter, a filter of from the outside toward the inside is general. In this case, the fiber diameter inside the filter is small or the pore diameter is small. However, even a filter contrary to the above may be sufficient, and in this case, it is easy to dispose a cylindrical filter after used.

The cylindrical filter of the present invention can be made into an electret filter. As a process for making it into an electret filter, a process wherein a microfine mixed fiber web, a non-woven fabric or a cylindrical filter prepared by winding up the same is treated with corona discharge of a direct current voltage of about 1 to 30 killovolts, etc., is employed, and a product having a surface discharge of about 10 to 45 coulomb/m$^2$ is preferred.

The high melting point microfine fibers of the present invention may be conjugate fibers of high melting point component with low melting point component, and such conjugate fibers provide a cylindrical filter having a higher withstanding pressure and a stabilized filtration accuracy. Alike, the low melting point microfine fibers may also be conjugate fibers of the high melting point component with the low melting point component, whereby a cylindrical filter having a higher withstanding pressure and a stabilized filtration accuracy is provided.

The cylindrical filter has a sufficient withstanding strength, even if it has no core, but it does not matter if there is a core. The cross-sectional shape of the core may be circular and besides, it may be elliptical, triangular, tetragonal or polygonal.

The cylindrical filter referred to in the present invention may have a cross-sectional shape which is circular or elliptical and besides, triangular, tetragonal or polygonal. In addition, in the case where the shape of the core is polygonal, the outer shape of the filter is liable to be close to a circular shape from the original polygonal shape, as the stacking of the fiber web proceeds, but this has no influence upon the characteristic of the filter.

The cylindrical filter of the present invention can be widely used as filters for washing liquid for electronic equipments, air filter for dust removal, prefilters for water for pharmaceuticals, foods, drinks, alcohol drinks, etc.

(EXAMPLE)

The present invention will be described in more detail by way of Examples. In addition, the values of physical properties shown in the Examples were measured according to the following methods:

(Filtration accuracy)

One filter was fixed into a housing, followed by passing water by circulation from a 30 l capacity water tank by means of a pump, controlling the flow quantity to 30 l/min, thereafter adding a cake (carborundum #4000) (5 g), collecting 10 ml of filtered water one minute after addition of the cake, filtering it through a membrane filter (a filter capable of collecting particles having particle diameters of 1 μm or larger), and measuring the particle size of the cake collected on the membrane filter, by means of a particle size distribution analyzer measuring the number of particles and each particle diameter. And the largest diameter of particles flown out was made the filtration accuracy.

(Average fiber diameter)

Samples were taken from the respective 5 parts inside a web or a filter, followed by taking an electronic microscopic photograph each sheet, measuring the fiber diameters of optional 20 ends of fibers from one photograph and calculating the average fiber diameter from 100 ends in total.

(Pore diameter)

The largest pore diameter (μm) was measured by means of a bubble point tester according to a method defined in ASTM-F-316-86. In addition, the pore diameter was measured by sampling a non-woven fabric being wound up on a rotating shaft.

(Filtration life and Withstanding Pressure)

One filter was fixed into a housing, followed by passing water under circulation by means of a pump from a 30 l capacity water tank, controlling the flow quantity to 30 l/min, thereafter adding a cake (No. 16 of JIS Z8901: heavy calcium carbonate having an average diameter of 3.5 μm), each 0.4 g, each interval of one minute, and continuing circulation of passing water while continuously adding the cake. The period (min) at which the pressure difference between the inlet and the exit of the filter reached 3 kg/cm$^2$ was made the filtration life.

The addition of the cake and the circulation of passing water were further continued, and were completed at the time when the pressure difference reached 10 kg/cm$^2$ or the filter was deformed. The pressure (kg/cm$^2$) at which the filter was deformed was made the withstanding strength, and the filter not deformed was regarded as a filter having a withstanding strength of 10 kg/cm$^2$ or higher.

Example 1

Spinning was carried out using a spinneret for melt-blown process, wherein the spinning nozzles for high melting point fibers and those for low melting point fibers, each having a hole diameter of 0.3 mm were arranged alternately and in a row (the total nozzle number: 501), and under the following conditions:

the spinning temperature: 280° C., the extruded quantity of a polypropylene having an MFR of 80 (g/10 min. at 230° C.) and a melting point of 165° C., of 60 g/min, the extruded quantity of a linear low density polyethylene having an MFR of 124 (g/10 min. at 190° C.) and a melting point of 122° C., of 60 g/min, the total extruded quantity: of 120 g/min, the pressure of blowing air at 350° C.: the initial pressure of 3.1 kg/cm$^2$·G being continuously and gradually reduced to the final pressure of 0.5 kg/cm$^2$·G, and the blowing air being blown onto a conveyer net provided with a suction means, to obtain a microfine mixed fiber web having a mixed ratio of high melting point microfine fibers to low melting point microfine fibers of 50/50 (by weight) and a basis weight of 49.0 g/m$^2$.

In this microfine mixed fiber web, weak adhesion occurred between fibers due to the heat retained by the fibers themselves.

This microfine mixed fiber web was heated by means of an air-through processing machine under conditions of a speed of 15 m/min and an atmospheric temperature of 140° C., followed by immediately winding up the web on a metal shaft of an outer diameter of 30 mm, cooling it while allowing to stand at room temperature, drawing out the shaft after cooling, and cutting the remaining fiber-molded product, to obtain a cylindrical filter having an outer diameter of 60 mm, an inner diameter of 30 mm and a length of 250 mm.

As a result of measuring a sample taken from the microfine mixed fiber web during spinning, its average fiber diameters were as follows:

1.1 µm on the inner side surface of the filter, 1.9 µm at 5 mm apart from the inner side, 3.7 µm at 10 mm apart from the inner side, and 8.1 µm on the outer side surface.

This cylindrical filter had the high melting point microfine fibers adhered by adhesion of the low melting point microfine fibers, to form a three-dimensional, reticulated structure. The maximum pore diameters of the filter were 12 µm on the inner side of the filter and 75 µm on the outer side surface. The filtrability of the filter was measured. AS a result, the filter was a superior one having a withstanding strength of 7.4 kg/cm$^2$, as filtration accuracy of 2.5 µm and a filtration life of 48 minutes, and forming no foam in the filtered water.

Example 2

Spinning was carried out using a spinneret used in Example 1, under the following conditions:

the spinning temperature: 280° C., the extruded quantity of a polyester having an intrinsic viscosity of 0.61 and a melting point of 252° C.: of 36 g/min, the extruded quantity of the same linear low density polyethylene as that used in Example 1: of 84 g/min, the total extruded quantity: of 120 g/min, and the pressure of blowing air at 400° C. being continuously and gradually reduced from the initial 2.8 kg/cm$^2$ down to the final 0.4 kg/cm$^2$, followed by blowing onto a conveyer net provided with a suction means, to obtain a microfine mixed fiber web having a mixing proportion of the high melting point microfine fibers to the low melting point microfine fibers of 30/70 (by weight) and a basis weight of 51.0 g/m$^2$. In this microfine fiber web, weak adhesion occurred between fibers due to the heat retained by the fiber themselves.

This microfine mixed fiber was heated, followed by winding up, to obtain a cylindrical filter as in the case of Example 1.

As a result of having measured the sample taken from this microfine mixed fiber web, the average fiber diameters were 1.8 µm on the inner side surface of the filter;

gradually increasing in the thickness direction; and 9.2 µm on the outer side surface. This cylindrical filter had the high melting point microfine fibers adhered due to melt-adhesion of low melting point microfine fibers, to form a three-dimensional, reticulated structure. The maximum pore diameters were 20 µm on the inner side of the filter and 84 µm on its outer side surface.

As a result of having measured the filtrability of this filter, the filter had a withstand strength of 7.4 fkg/cm$^2$, a filtration accuracy of 4.5 µm, and a filtration life of 67 minutes, and formed no foam in the filtered water; thus the filter was superior.

Example 3

Spinning was carried out in the same manner as in Example 2, except for the following conditions:

The extruded quantity of a polyester having an intrinsic viscosity of 0.61 and a melting point of 253° C.: of 48 g/min, The extruded quantity of an ethylene glycol.terephthalate.isophthalate copolymer having an intrinsic viscosity of 0.55 and a melting point of 205° C.: of 72 g/min, the total extruded quantity: of 120 g/min, the spinning temperature: 300° C., to obtain a microfine mixed fiber web having a mixing proportion of the high melting point microfine fibers to the low melting microfine fibers of 40/60 (by weight). This microfine fiber web formed a weak adhesion between fibers, due to the heat retained by the fibers themselves.

The above microfine mixed fiber web extruded from a spinneret was blown directly onto an air-permeable, metal shaft having a outer diameter of 30 mm and rotating at 10 m/min, provided with a suction mechanism, followed by winding up the web so as to give an outer diameter of 62 mm, allowing it to cool at room temperature, thereafter drawing out the shaft and cutting the winded web so as to give a length of 250 mm, to obtain a cylindrical filter. At the time of winding up, the atmospheric temperature of the web during winding up was heated to 140° C. by means of an infrared heater, to improve the adhesion of the microfine mixed fiber web.

Samples taken from the web during the spinning were measured. As a result, since the extruded quantities of two different kinds of the polyesters per spinning nozzles were different, the filter had fibers of thick fineness and fibers of thin fineness in admixture both in the inner layer and the outer layer. The average diameters of the resulting cylindrical filter were 2.0 µm on the inner side surface, gradually increased in the thickness direction, and were 9.5 µm on the outer side surface.

The filtrability of this filter was measured, and as a result, the filter was a superior product having a withstanding strength of 8.4 kg/cm$^2$, a filtration accuracy of 3.3 µm and a filtration life of 43 minutes and forming no foam in the filtered water.

Example 4

Spinning was carried out using the same spinneret as that of Example 1, under conditions of a spinning temperature of 290° C., a temperature of blowing air of 330° C. and a pressure of 1.9 kg/cm$^2$·G, while extruding a polypropylene having an MFR of 80 (g/10 min. at 230° C.) and a melting point of 165° C. and a propylene.ethylene.butene-1 random copolymer having an MFR of 65 (g/10 min. at 230° C.) and a melting point of 138° C., each in an equal quantity, and gradually increasing the total extruded quantity from the initial 100 g/min up to the final quantity of 200 g/min, followed by blowing the extrudate onto a conveyer net provided with a suction means, to obtain a microfine mixed fiber web having a mixing ratio of the high melting point microfine fibers to the low melting point microfine fibers of 50/50 (by weight). In this microfine mixed fiber web, a weak adhesion occurred between the fibers, due to the heat retained by the fibers themselves.

This microfine mixed fiber web was heated by means of an air-through processing machine under conditions of a speed of 15 m/min and an atmospheric temperature of 145° C. followed by immediately winding up the web onto a hexagonal (each side: 15 mm), metal shaft, allowing it to cool at room temperature, drawing out the shaft and cutting the resulting material to a length of 250 mm, to obtain a cylindrical filter. This filter had a maximum outer diameter of 60 mm and a minimum one of 52 mm, that is, the shape became approximately close to circle.

The sample taken from the web during the spinning was measured. As a result, the average fiber diameters were 0.9 μm on the inner side surface, gradually increased in the thickness direction and was 7.7 μm on the outer side surface.

The filtrability of the filter was measured. The filter was a superior one having a withstand strength of 7.2 kg/cm², a filtration accuracy of 2.1 μm, and a filtration life of 40 minutes and forming no foam in the filtered water.

Example 5

Spinning was carried out employing a mixed fiber type, melt-blown spinneret, wherein 351 spinning nozzles for extruding high melting point fibers and 150 spinning nozzles for extruding low melting point fibers were uniformly distributed, the hole diameter was 0.3 mm and the total number of holes was 501, under conditions of a spinning temperature of 285° C.; an extruded quantity of polypropylene having an MFR of 122 (g/10 min. at 230° C.) and a melting point of 165° C., of 84 g/min/351 holes; an extruded quantity of a propylene.ethylene.butene-1 random copolymer having an MFR of 65 (g/10 min. at 230° C.) and a melting point of 138° C., of 36 g/min/150 holes; a total extruded quantity of 120 g/min; and a pressure of blowing air at 360° C. continuously reduced from an initial 3.4 kg/cm²·G down to a final pressure of 0.7 kg/cm²·G, followed by blowing the resulting material onto a conveyer net provided with a suction means, to obtain a microfine mixed fiber web having a mixing ratio of high melting point microfine fibers to low melting point microfine fibers of 70/30 (by weight) and a basis weight of 50 g/m². In this microfine fiber web, a weak adhesion occurred between the fibers due to the heat retained by the fibers themselves.

This microfine mixed fiber web was heated by means of an air-through processing machine under conditions of a speed of 15 m/min and an atmospheric temperature of 140° C., to obtain a non-woven fabric having the polypropylene fibers fixed by melt adhesion of the propylene.ethylene.butene-1 random copolymer. This non-woven fabric was heated by means of an air-through processing machine as in the case of Example 1, followed by immediately winding up it onto a metal shaft having an outer diameter of 30 mm, allowing the resulting material to stand at room temperature, thereafter drawing out the shaft, and cutting the remaining fiber-molded product, to obtain a cylindrical filter having an outer diameter of 60 mm, an inner diameter of 30 mm and a length of 250 mm.

A sample taken from the web during the spinning was measured. As a result, since the extruded quantities of the two kinds of the resin, per the spinning nozzles, were equal, the fiber diameter of the high melting point microfine fibers and the low melting point microfine fibers were almost equal, and the average fiber diameters were 0.8 μm on the inner side surface, 2.2 μm at a part of 7 mm apart from the inner side, and 7.4 μm on the outer side surface. The maximum pore diameters of this filter were 7 μm inside the filter, gradually increased in the thickness direction and were 62 μm on the outside surface.

The filtrability of the filter was measured. The filter was a superior one having a withstand strength of 6.5 kg/cm², a filtration accuracy of 1.1 μm and a filtration life of 48 minutes and forming no foam in the filtered water.

Example 6

Spinning was carried out using the same spinneret as used in Example 5 and two kinds of thermoplastic resins, under the following conditions:

spinning temperature: 285° C., the extruded quantity of a propylene.ethylene.butene-1 random copolymer: 84 g/min/351 holes, the extruded quantity of a polypropylene: 36 g/min/150 holes, the total extruded quantity: of 120 g/min, the conditions of blowing air: temperature: 340° C., pressure: continuously reduced from the initial 2.9 kg/cm²·G down to the final 1.2 kg/cm²·G, followed by blowing the resulting material onto a conveyer net provided with a suction means, to obtain a microfine mixed fiber web having a mixing ratio of the high melting point microfine fibers to the low melting point microfine fibers of 30/70 (by weight) and a basis weight of 50 g/m².

This web was treated in the same manner as in Example 5, to obtain a cylindrical filter having an outer diameter of 60 mm, an inner diameter of 30 mm and a length of 250 mm.

A sample taken from the web during the spinning was measured. As a result, the fiber diameters of the high melting point microfine fibers and the low melting point microfine fibers are nearly equal although certain dispersions of the fiber diameters were observed, that is, the average fiber diameters were 1.4 μm on the inner side surface, 2.9 μm at 7 mm apart from the inner side, and 4.4 μm on the outer side surface.

The filtrability of the filter was measured. As a result, the filter was a superior one having a withstand strength of 6.7 kg/cm², a filtration accuracy of 2.0 μm and a filtration life of 38 minutes and forming no foam in the filtered water.

Example 7

Example 1 was repeated except that the pressure of the blowing air was kept constant at 1.7 kg/cm²·G, to obtain a cylindrical filter having an outer diameter of 60 mm, an inner diameter of 30 mm and a length of 250 mm.

A sample taken from the web during the spinning was measured. As a result, since the extruded quantities of two kinds of the resins per spinning nozzles were the same, the fiber diameters of the high melting point microfine fibers and the low melting point microfine fibers were nearly equal, and the average fiber diameters were 2.2 μm on the whole layers.

The filtrability of this filter was measured. The filter was a superior one having a withstand strength of 7.0 kg/cm², a filtration accuracy of 4.1 μm and a filtration life of 22 minutes and forming no foam in the filtered water.

Example 8

Example 1 was repeated except that the pressure of the blowing air was kept constant at 1.2 kg/cm²·G, to obtain a cylindrical filter having an outer diameter of 60 mm, an inner diameter of 30 mm and a length of 250 mm.

A sample taken from the web during the spinning was measured. As a result, since the extruded quantities of the two kinds of the resins were the same, the fiber diameters of the high melting point microfine fibers and the low melting point microfine fibers were nearly equal and the average fiber diameters were 6.0 μm on the whole layers.

The filtrability of this filter was measured. The filter was a superior one having a withstand strength of 7.6 kg/cm², a filtration accuracy of 5.8 μm and a filtration life of 35 minutes and forming no foam in the filtered water.

Example 9

Spinning was carried out employing the same spinneret as used in Example 1 and the following conditions:

The extruded quantity of a polypropylene having an MFR of 80 (g/10 min. at 230° C.), and a melting point of 165° C., of 60 g/min, at a spinning temperature of 290° C., the extruded quantity of a propylene.ethylene.butene-1 random copolymer having an MFR of 65 (g/10 min. at 230° C.) and a melting point of 138° C., of 60 g/min, at a spinning temperature of 310° C.; and the pressure of the blowing air at 340° C.: continuously changed as follows: initially 0.4 kg/cm²·G, intermediately 3.0 kg/cm²:G and finally again 0.4 kg/cm²·G, followed by blowing the air onto a conveyer net provided with a suction means, to obtain a microfine mixed fiber web having a mixing ratio of the high melting point microfine fibers to the low melting point microfine fibers of 50/50 (by weight). In this microfine mixed fiber web, a weak adhesion occurred between the fibers due to the heat retained by the fibers themselves.

This microfine mixed fiber web was heated by means of an air-through processing machines under conditions of a speed of 12 m/min, and an atmospheric temperature of 145° C., followed by immediately winding up the web onto a metal shaft having an outer diameter of 30 mm, cooling it by allowing it to stand at room temperature, thereafter drawing out the shaft, and cutting the remaining fiber-molded product, to obtain a cylindrical filter having an outer diameter of 60 mm, an inner diameter of 30 mm and a length of 250 mm.

A sample taken from the microfine mixed fiber web during the spinning was measured. As a result, the average fiber diameters were 8.2 μm on the inner side surface, 0.8 μm at 8 mm apart from the inner side and 8.3 μm on the outer side surface. This cylindrical filter had the high melting point microfine fibers adhered by melt-adhesion of the low melting point microfine fibers, to form a three-dimensional, reticulated structure. The maximum pore diameters of the filter were 81 μm on the inner side of the filter, 15 μm at 8 mm apart from the inner side and 79 μm on the outer side surface. The filtrability of the filter was measured. As a result, the filter was a superior one having a withstand strength of 8.8 kg/cm², a filtration accuracy of 1.6 μm and a filtration life of 49 minutes and forming no foam in the filtered water.

Example 10

Spinning was carried out in the same manners as in Example 1, except that the pressure of the blowing air was kept, constant at 1.7 kg/cm²·G, followed by blowing the resulting material onto a conveyer net provided with a suction means, to obtain a microfine mixed fiber web having a mixing ratio of high melting point microfine fibers to low melting point microfine fibers, each having the same average fiber diameter of 2.2 μm, of 50/50 (by weight) and a basis weight of 49.0 g/m². In this microfine fiber web, a weak adhesion occurred between the fibers due to the heat retained by the fibers themselves.

Two sheets of the web were laminated, followed by heating the laminate for 5 minutes by means of a hot-air dryer at 140° C. and cold-pressing by means of a mold for shoulder pad, to form a steric molded product. This sterically molded product had neither fluffs nor wrinkles, and a suitable softness, and could be preferably used for shoulder pad.

Example 11

Spinning was carried out employing a melt-blown spinneret for mixed fibers wherein 200 spinning nozzles for extruding high melting point fibers, 200 spinning holes for extruding low melting point fibers and 101 spinning holes for extruding side-by-side conjugate fibers were uniformly distributed, the hole diameter being 0.3 mm and the number of the total holes being 501, under the following conditions:

the spinning temperature: 270° C., the extruded quantity of a polypropylene having an MFR of 122 (g/10 min. at 230° C.) and a melting point of 165° C., of 48 g/min/200 holes, the extruded quantity of a propylene.ethylene.butene-1 random copolymer having an MFR 65 (g/10 min. at 230° C.) and a melting point of 138° C., of 48 g/min/200 holes, the extruded quantity of composite fibers of the above two kinds of polymers in an equal quantity, of 24 g/min/101 holes, the total extruded quantity of 120 g/min, and the pressure of blowing air at 230° C. of initially 0.6 kg/cm²·G, intermediately 3.5 kg/cm²·G and finally 0.6 kg/cm²·G, these pressures being continuously reduced, followed by blowing the resulting material onto a conveyer net provided with a suction means, to obtain a microfine mixed fiber web having a basis weight of 50 g/m². In this microfine fiber web, a weak adhesion occurred between the fibers due to the heat retained by the fibers themselves.

This microfine mixed fiber web was heated by means of an air-through processing machine under conditions of a speed of 15 m/min and an atmospheric temperature of 146° C., to obtain a non-woven fabric having the polypropylene fibers fixed by heat-adhesion of the propylene.ethylene.butene-1 copolymer. This non-woven fabric was heated by means of an air-through processing machine as in Example 1, followed by immediately winding up the fabric onto a metal shaft having an outer diameter of 30 mm, allowing the resulting material to stand at room temperature for cooling, thereafter drawing out the shaft and cutting the remaining fiber molded product, to obtain a cylindrical filter having an outer diameter of 60 mm, an inner diameter of 30 mm and a length of 250 mm.

A sample taken from the web during the spinning was measured. As a result, the average fiber diameters were 10.2 μm on the inner side surface of the filter, 0.8 μm at 7 mm apart from the inside and 9.8 μm on the outside surface.

The filtrability of this filter was measured. The filter was a superior one having a withstand strength of 7.0 kg/cm², a filtration accuracy of 1.1 μm and a filtration life of 40 minutes and forming no foam in the filtered water.

Comparative Example 1

Spinning was carried out employing a single component type spinneret for melt-blown having a hole diameter of 0.3 mm and 501 holes, under the following conditions:

the total extruded quantity of a polypropylene having an MFR of 68 (g/10 min. at 230° C.) and a melting point of 164° C., of 120 g/min, the spinning temperature: 300° C., and the pressure of blowing air at 380° C.: 1.4 kg/cm²·G, followed by blowing the resulting material onto a conveyer net provided with a suction means, to obtain a microfine fiber web having a basis weight of 52.0 g/m², and winding up the web onto a paper tube. In the microfine fiber web, a weak adhesion occurred between the fibers due to the heat retained by the fibers themselves. This microfine fiber web was heated by means of an air-through processing machine under conditions of a speed of 15 m/min and an atmospheric temperature of 170° C., to obtain a non-woven fabric. In this non-woven fabric, the fibers melt-adhered to each other, but many wrinkles occurred due to vigorous heat-shrinkage; hence the fabric was judged to be unsuitable to filter production.

Comparative Example 2

Spinning was carried out under the same conditions as in the above Comparative example 1. While the resulting microfine fiber web was heated by means of an air-through processing machine under conditions of a speed of 15 m/min and an atmospheric temperature of 165° C., the web was wound up onto a metal shaft having an outer diameter of 30 mm, followed by allowing the resulting material to cool to room temperature, thereafter drawing out the shaft and cutting the resulting material, to obtain a cylindrical filter having an outer diameter of 60 mm, an inner diameter of 30 mm and a length of 250 mm.

Since the heating temperature of the microfine fiber web was lower than that in Comparative example 1, the wrinkles generated due to heat shrinkage were considerably less than those in Comparative example 1, but the melt-adhesion of fibers to each other is little, and the resulting cylindrical filter was soft to an extent to which it was readily deformed when pushed by hand.

A sample taken from the web during the spinning was measured. As a result, the average fiber diameters were 3.5 μm on the inner side surface, 3.7 μm at 10 mm apart from the inside and 3.7 μm on the outer side surface, that is, the fiber diameters were nearly constant.

The filtrability of the filter was measured. As a result, the filter had a withstand strength of 1.9 kg/cm$^2$, a filtration accuracy of 18 μm and a filtration life of 121 minutes.

Effectiveness of the Invention

The cylindrical filter of the present invention consists of microfine mixed fibers spun according to melt-blown process, consisting of high melting point microfine fibers and low melting point microfine fibers having a melting point difference of 10° C. or more, and obtained by winding up a web containing 10 to 90% by weight of the low melting point microfine fibers in the mixed fibers, followed by heat treatment to form a three-dimensional, reticulated structure having the high melting point microfine fibers fixed by melt adhesion of the low melting point microfine fibers.

Since the cylindrical filter is composed of microfine fibers, it has a high filtration accuracy, and since its structure is fixed by melt adhesion of the fibers onto one another, it has a high withstand strength even when it has no reinforcing material therein, and its filtration accuracy is not varied even by sterilizing treatment, high temperature filtration, vibration, water-pressure variation, etc.

Further, the cylindrical filter of the present invention having the fiber diameter or the pore diameter varied in the filtration direction has a characteristic of a long filtration life besides the above-mentioned characteristics.

The cylindrical filter consisting of microfine mixed fibers spun according to melt-blown process contains no spinning oiling agent; hence a step of pre-washing in order to remove the oiling agent is unnecessary and it is hygienically usable in the food fields.

According to the production process of the filter of the present invention, since a structurally complicated conjugate spinneret apparatus is not employed, a cylindrical filter having superior properties is obtained according to an easy process.

What we claim is:

1. A process for producing a cylindrical filter consisting of high melting point thermoplastic resin microfine fibers and low melting point thermoplastic resin microfine fibers and having said high melting point thermoplastic resin microfine fibers fixed by melt-adhesion of said low melting point thermoplastic resin microfine fibers thereunto, which process comprises a step of spinning a high melting point thermoplastic resin and a low melting point thermoplastic resin, having a melting point difference of 10° C. or more, according to a melt-blown spinning process, using the respective extruders therefor, through separate spinning nozzles in the same spinneret to form a combination of high melting point thermoplastic resin microfine fibers and low melting point thermoplastic resin microfine fibers wherein said high melting point thermoplastic resin microfine fibers and said low melting point thermoplastic resin microfine fibers are uniformly mixed in substance, while controlling the quantity of the low melting point thermoplastic resin extruded so as to give 10 to 90% by weight based upon the total extruded quantity of thermoplastic resins, to obtain a thermoplastic resin microfine mixed fiber web, a step of heating the thermoplastic resin microfine fiber web at a temperature between the melting temperature of the low melting point thermoplastic resin microfine fibers and that of the high melting point thermoplastic resin microfine fibers to bond the high melting point thermoplastic resin microfine fibers together, and a step of winding up the thermoplastic resin microfine mixed fiber web into a cylindrical form.

2. A cylindrical filter causing no foaming in a liquid filtrate and composed of a combination of thermoplastic resin microfine fibers spun according to a melt-blown process, said combination of thermoplastic resin fibers consisting of high melting point thermoplastic resin microfine fibers and low melting point thermoplastic microfine fibers having a melting point difference of 10° C. or more and containing no spinning oil, said high melting point thermoplastic resin microfine fibers having been fixed by melt adhesion of said low melting point thermoplastic resin microfine fibers contained in said thermoplastic resin microfine fiber combination in a proportion of 10 to 90% by weight at substantially all points where said high melting point thermoplastic resin microfine fibers and said low melting point thermoplastic resin microfine fibers contact each other in said cylindrical filter, said combination being achieved by extruding a high melting point thermoplastic resin and a low melting point thermoplastic resin through separate spinning nozzles in the same spinneret.

3. A cylindrical filter causing no foaming in a liquid filtrate according to claim 2, wherein the fiber diameter of said high melting point thermoplastic resin microfine fibers and/or said low melting point thermoplastic resin microfine fibers is successively reduced along the filtration direction of the filter and the ratio of the maximum fiber diameter to the minimum one is twice or more.

4. A cylindrical filter causing no foaming in a liquid filtrate according to claim 2, wherein the pore diameter of a filtration layer of the filter is successively reduced along the filtration direction of the filter and the ratio of the maximum pore diameter to the minimum one is twice or more.

5. A cylindrical filter causing no foaming in a liquid filtrate according to claim 2, wherein the pore diameter of a filtration layer of the filter is varied in the order of large, small and large along the filtration direction, and the ratio of the maximum pore diameter to the minimum one is twice or more.

6. A cylindrical filter composed of a combination of thermoplastic resin microfine fibers, said combination of fibers comprising high melting point thermoplastic resin microfine fibers and low melting point thermoplastic resin microfine fibers having a melting point difference of 10° C. or more, said high melting point thermoplastic resin microfine fibers having been fixed by melt adhesion of said low melting point thermoplastic resin microfine fibers contained in said thermoplastic resin microfine fiber combination in a proportion of 10 to 90% by weight, at substantially all points where said high melting point thermoplastic resin microfine fibers and said low melting point thermoplastic resin microfine fibers contact each other in said cylindrical filter said combination being achieved by extruding a high melting point thermoplastic resin and a low melting point thermoplastic resin through spinning nozzles and said melt adhesion substantially being performed at a step subsequent to said extruding.

7. The cylindrical filter of claim 2, wherein at least one of the high melting point thermoplastic resin microfine fibers or the low melting point thermoplastic resin microfine fibers is a conjugate fiber.

8. The cylindrical filter of claim 6, wherein at least one of the high melting point thermoplastic resin microfine fibers or the low melting point thermoplastic resin microfine fibers is a conjugate fiber.

* * * * *